Figure 1:
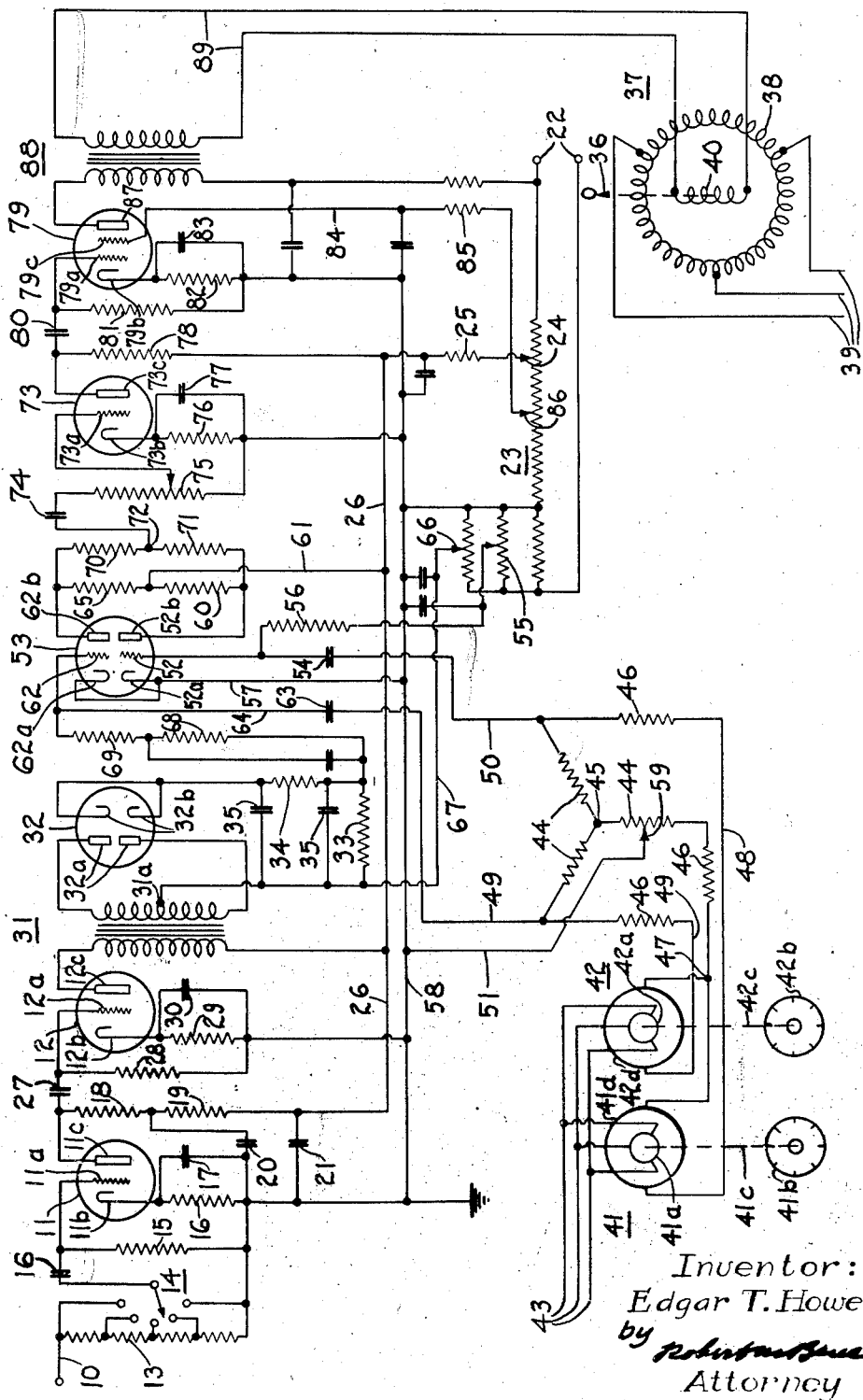

May 13, 1947.　　　　E. T. HOWES　　　　2,420,596
VACUUM TUBE VOLTAGE INDICATOR OR RECORDER
Filed Sept. 2, 1943　　　3 Sheets-Sheet 1

Inventor:
Edgar T. Howes
by
Attorney

May 13, 1947.  E. T. HOWES  2,420,596
VACUUM TUBE VOLTAGE INDICATOR OR RECORDER
Filed Sept. 2, 1943   3 Sheets-Sheet 2

Inventor:
Edgar T. Howes
by Robert M. Bruce
Attorney

May 13, 1947.  E. T. HOWES  2,420,596
VACUUM TUBE VOLTAGE INDICATOR OR RECORDER
Filed Sept. 2, 1943  3 Sheets-Sheet 3

Inventor
Edgar T. Howes
by Christie & Angus
Attorneys.

Patented May 13, 1947

2,420,596

UNITED STATES PATENT OFFICE 2,420,596

VACUUM TUBE VOLTAGE INDICATOR OR RECORDER

Edgar T. Howes, Pasadena, Calif.

Application September 2, 1943, Serial No. 501,025

12 Claims. (Cl. 171—95)

My invention relates to a voltage indicator or recorder.

An object of my invention is to provide a voltage indicator in which an arrangement is provided for receiving a voltage to be indicated, a source of voltage for producing substantially zero indication when the voltage being indicated is zero, and an arrangement utilizing the voltage being indicated for producing a voltage opposing the source of the voltage, and for producing an indication of the voltage received.

Another object of my invention is to provide a voltage indicator in which an arrangement is provided for receiving the voltage to be indicated, in which an electron discharge tube is used having a grid biased beyond cut-off, and an arrangement utilizing the voltage received for producing a voltage opposing the grid biasing voltage and for producing an indication of the voltage received.

Another object of my invention is to provide a voltage indicator in which an arrangement is provided for receiving a voltage to be indicated, an arrangement for amplifying the voltage to be indicated, an arrangement for rectifying the voltage to be indicated, an arrangement for providing an opposing voltage normally preventing an indication, and an arrangement utilizing the amplified and rectified voltage for reducing the opposing voltage and for indicating the voltage received.

Another object of my invention is to provide a voltage indicator including an arrangement for receiving a voltage to be indicated, an arrangement for providing a component of an alternating electrical characteristic, and an arrangement utilizing the voltage being indicated for controlling the alternating electrical characteristic component and for indicating the voltage received.

Another object of my invention is to provide a voltage indicator including an arrangement for receiving the voltage to be indicated, an arrangement for maintaining a movable indicating element in its zero position, an arrangement for providing a phase displaced from zero component of an alternating electrical characteristic, and an arrangement utilizing the voltage to be indicated for controlling the alternating electrical characteristic component means and for moving the movable indicating element from its zero position to indicate the voltage received.

Another object of my invention is to provide a voltage indicator including an arrangement for receiving the voltage to be indicated, a movable indicating element, an arrangement including a substantially constant zero phase component of an alternating electrical characteristic for maintaining the indicating element in its zero position, an arrangement including another phase displaced from zero component of an alternating electrical characteristic, and an arrangement for utilizing the voltage to be indicated for controlling the other alternating electrical characteristic component means and for moving the movable indicating element to indicate the voltage received.

Another object of my invention is to provide a voltage indicator including an arrangement for providing an alternating electrical characteristic, an arrangement for providing another alternating electrical characteristic, and an arrangement for utilizing the voltage received for controlling one of the alternating electrical characteristics and for producing an indication of the voltage received.

Another object of my invention is to provide a voltage indicator including an arrangement for receiving the voltage to be indicated, an arrangement for providing an alternating electrical characteristic, an arrangement for providing a phase displaced alternating electrical characteristic, and an arrangement utilizing the voltage received for controlling one of the alternating electrical characteristics and for producing an indication of the voltage received.

Another object of my invention is to provide a voltage indicator including an arrangement for receiving a voltage to be indicated, an arrangement for producing an alternating electrical characteristic, an arrangement for producing another alternating electrical characteristic, an electron discharge tube circuit including a grid, an arrangement for supplying the alternating electrical characteristics to the electron discharge tube circuit, an arrangement utilizing the voltage to be indicated for controlling the grid of the electron discharge tube circuit and for controlling one of the alternating electrical characteristics, and an arrangement responsive to the alternating electrical characteristics for indicating the voltage received.

Another object of my invention is to provide a voltage indicator including an arrangement for producing a substantially constant electrical characteristic, an arrangement for producing another alternating electrical characteristic, an electron discharge tube circuit including a grid, an arrangement for supplying the electrical characteristics to the electron discharge tube circuit, an arrangement utilizing the voltage received for controlling the grid of the electron discharge tube circuit and the second mentioned electrical characteristic, an arrangement including a resistance coupling for combining the alternating electrical characteristics, and an arrangement responsive to the combined electrical characteristics for indicating the voltage received.

Another object of my invention is to provide a voltage indicator or recorder producing substantially constant torque in all positions.

Another object of my invention is to provide a voltage indicator or recorder producing substantially constant torque in all positions and producing sufficient torque to minimize the effect of friction.

Further objects and advantages of my invention will become apparent as the following description proceeds, and the features of novelty which characterize my invention will be set forth in the claims annexed to and forming a part of this specification.

Figure 2:
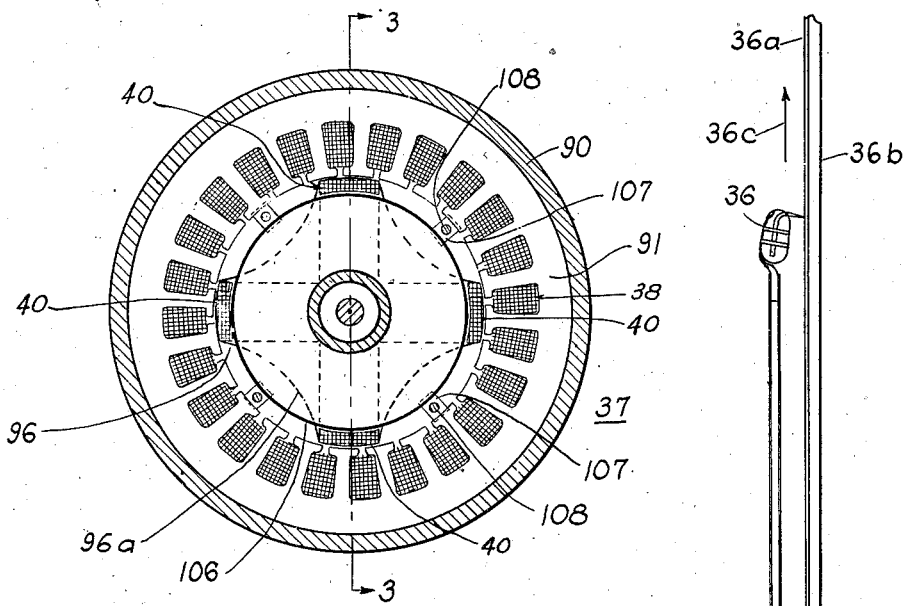
Figure 3:
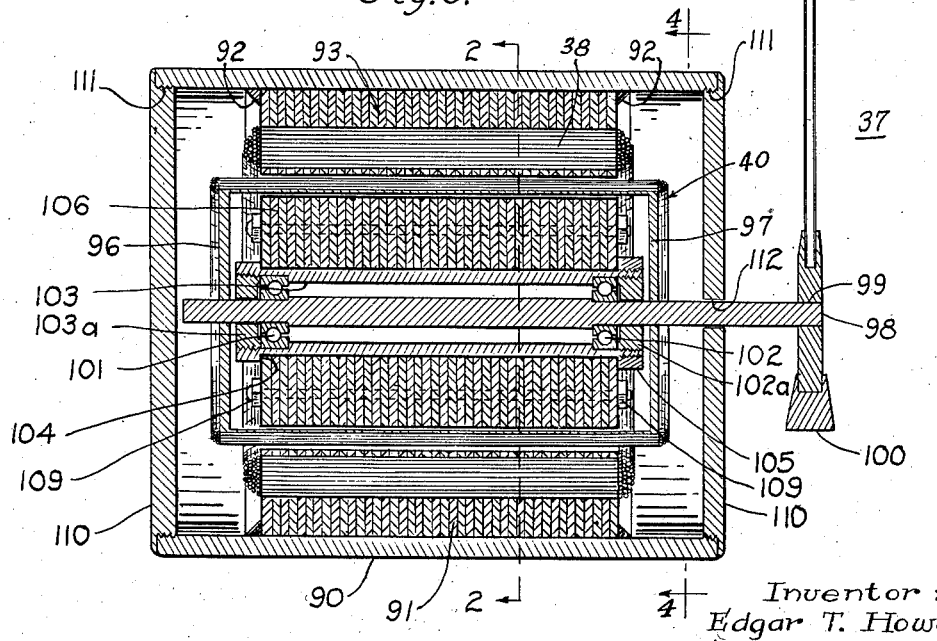
Figure 4:
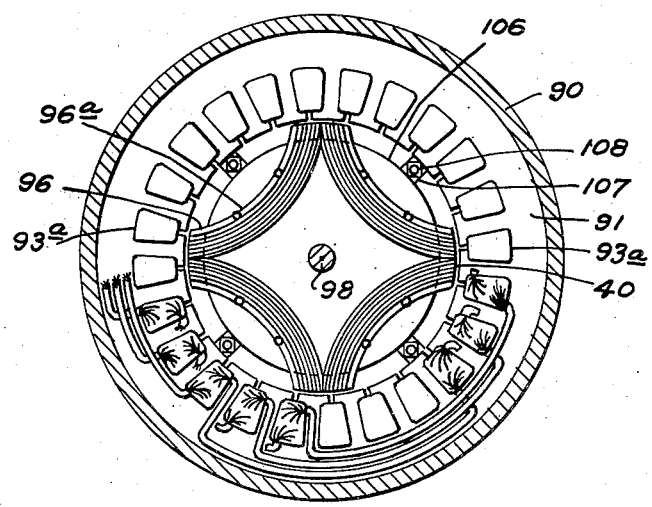
Figure 5:
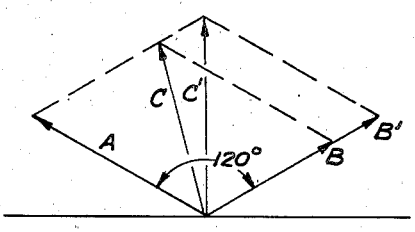
Figure 6:
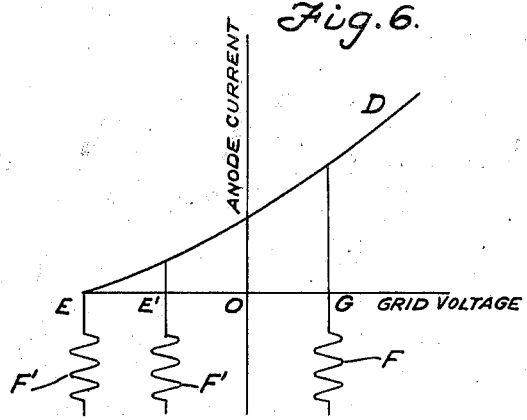

In the drawings, Fig. 1 is a schematic diagram of the electrical circuits and instruments embodying the novel features of my invention; Fig. 2 is a transverse sectional view on the line 2—2 of Fig. 3 showing the constructional features of my voltage indicating or recording instrument which I preferably employ in the circuit arrangement shown in Fig. 1 of the drawings; Fig. 3 is a longitudinal sectional view on the line 3—3 of Fig. 2 of the voltage indicating or recording instrument shown in Fig. 2; Fig. 4 is a sectional view taken at line 4—4 of Fig. 3; Fig. 5 is a vector diagram showing the voltage relations in parts of the system; and Fig. 6 shows graphically voltage relationships existing in the system.

Referring to the drawings, in Fig. 1 I have shown the schematic diagram of an electron discharge tube circuit arrangement in which a feeble voltage is indicated, such as the electrical characteristic or voltage derived from the bridge circuit of an electrical testing system disclosed in my copending concurrently filed applications, entitled Apparatus for electrically testing materials, Ser. No. 501,023; and entitled Method and apparatus for electrically testing materials, Ser. No. 501,024. My improved voltage indicator or recorder is, however, of general application and may be utilized in connection with any electrical circuits or apparatus in which it may be found to be useful.

In the circuit arrangement shown in Fig. 1 of the drawings, the relatively feeble voltage to be indicated or recorded is derived from the alternating voltage source at 10. This feeble voltage preferably is amplified to produce a controlling voltage in opposition to another source of voltage, such as the control voltage or the grid bias voltage in an electron discharge tube circuit.

In the particular arrangement shown, which is illustrative of one particular manner of carrying out my invention, the relatively feeble voltage derived from the source at 10 is amplified in resistance coupled three element electron discharge tubes 11 and 12. The voltage to be indicated or recorded is applied to a resistor 13, which is selectively adjustable by a one-pole, five-position switch 14 having its stationary contacts connected to taps in the resistor 13. The one-pole, five-position switch 14 is normally in engagement with one of the stationary contacts, the contact being selected to control the energy input to the circuit arrangement. The switch 14 is connected across the input resistor 15 through a blocking condenser 16 to the grid 11a of the three-element electron discharge tube 11 having a direct or indirect heating element or filament 11b and a plate 11c. The bias on the grid 11a is controlled by the grid bias resistor 16 having a by-pass condenser 17 across the same for alternating or pulsating current. The output from the amplifying electron discharge tube 11 is connected to plate circuit load resistor 18. A filter is arranged in the plate circuit of the electron discharge tube 11 to minimize oscillation of the tube, and includes a resistor 19 and filter condensers 20 and 21. The plate voltage and biasing voltages for this circuit arrangement is derived from the source of supply at 22, such as a rectified alternating current source, and the resistance 23 connected across the same. The plate voltages are derived at 24 through a resistor 25 and conductor 26. The output from the amplifying electron discharge tube 11 to the amplifying electron discharge tube 12 is through a blocking condenser 27 and input resistor 28 to the grid 12a of the amplifying electron discharge tube 12. The direct or indirect heating element or filament 12b is provided with a grid bias resistor 29 and a by-pass condenser 30. The output from the plate 12c of the amplifying electron discharge tube 12 is to the primary of an iron core transformer 31. The output of this iron core transformer 31 is to a double two-element rectifying tube 32 having plates 32a connected across the secondary of the transformer 31 and direct or indirect heating elements or filaments 32b connected together and through an output load resistor 33 to the mid-tap 31a of the iron core transformer 31. The rectified direct current output of the rectifying tube 32 is filtered by a circuit arrangement including a resistor 34 and filter condensers 35, so as to build up a direct-current voltage across the load resistor 33 proportional to the input at 10 of the amplifying and rectifying arrangement. When the input at 10 is zero the direct-current voltage across the resistor 33 is zero and the stylus, pen, or indicating hand 36 of the voltage indicating or recording instrument 37 is in its zero position. Within the range of the instrument 37, the direct-current voltage built up across the output load resistor 33 is directly proportional to the input voltage at 10, and the movement of the stylus, pen, or indicating hand 36 of the indicating or recording instrument 37, is proportional to the input at 10, and gives an indication or record of the voltage to be indicated which is received at 10.

This mode of operation of the voltage instrument 37 may be accomplished in any suitable manner, however, I prefer to obtain this mode of operation by constructing the voltage instrument 37 with a stationary three-phase distributed winding 38 connected to a three-phase alternating-current source of supply 39 which provides a rotating field, and a single-phase two-pole concentrated winding 40 rotatably mounted in bearings within the stationary three-phase winding and connected to the external circuit through suitable flexible conductors or springs providing the necessary angular movement of the recording stylus, pen, or indicating hand 36 of the voltage instrument. The single-phase two-pole concentrated winding 40 of the voltage indicating or recording instrument 37 is excited under the control of the output load resistor 33 in such manner that the angular movement of the stylus, pen, or indicating hand 36 of the voltage instrument 37 gives the necessary indication or record of the voltage received at 10. In the particular arrangement illustrated in Fig. 1 of the drawings the direct-current voltage built up across the output load resistor 33 controls an alternating electrical characteristic or voltage, and this alternating electrical characteristic or voltage causes the stylus, pen, or indicating hand 36 of the voltage indicator 37 to move angularly to give the desired indication of the voltage received at 10. In accordance with a further particular embodiment of my invention at least one alternating electrical characteristic is controlled by the direct-current voltage across the output load resistor 33, so that the combined effect of these alternating electrical characteristics causes the stylus, pen, or indicating hand 36 of the voltage indciating or recording instrument 37 to move angularly and give the desired indication of the voltage received at 10. These alternating electrical characteristics may be phase-displaced and provide a resultant of the electrical characteristics producing the desired angular movement of the stylus, pen, or indicating hand 36 of the voltage indicating or recording instrument 37.

In the arrangement illustrated in the drawings the direct-current voltage built up across the output load resistor 33 is utilized to control an electron discharge tube circuit in which one component of an alternating electrical characteristic is maintained substantially constant and maintains the stylus, pen, or indicating hand 36 of the voltage instrument 37 in its zero position, as long as the voltage to be indicated and received at 10 is zero. Another component of an alternating electrical characteristic phase-displaced from the first mentioned component is utilized in this electron discharge tube circuit, and controlled by the direct-current voltage built-up across the output load resistor 33 and proportional to the voltage to be indicated and received at 10. The combined action of these phase-displaced components of the substantially constant component alternating electrical characteristic and variable component alternating electrical characteristic proportional to the input at 10 is utilized to energize the single-phase two-pole concentrated winding 40 of the voltage instrument 37, and move the stylus, pen, or indicating hand 36 angularly to give the correct indication of the voltage received at 10.

The alternating electrical characteristics utilized in the particular arrangement shown in Fig. 1 of the drawings are of the single-phase type and derived from phase mixers 41 and 42. The phase mixer 41 provides a single-phase substantially constant zero phase component, and the phase mixer 42 provides a single-phase phase-displaced from zero component controlled in magnitude proportionally by the direct-current voltage built-up across the output load resistor 33 which is proportional to the voltage being measured and derived at 10 from the source of supply. The phase mixers 41 and 42 have three-phase distributed rotatable windings 41a and 42a connected to a three-phase alternating-current source of supply 43 through suitable slip rings and brushes. These three-phase distributed rotatable windings 41a and 42a are rotatable through three hundred and sixty electrical degrees by dials 41b and 42b connected thereto by shafts 41c and 42c. The three-phase distributed rotatable windings 41a and 42a are arranged within the stationary distributed single-phase windings 41d and 42d. The single-phase output of the phase mixers 41 and 42 is supplied to three network resistors 44 connected together at their adjacent ends 45. The phase mixers 41 and 42 are connected to the network resistors 44 through output limiting resistors 46. The right-hand terminals of phase mixers 41 and 42 are connected together at 47 and through the output limiting resistor 46 to the intermediate network resistor 44. The left-hand terminal of the phase mixer 41 is connected by conductor 48 through the output limiting resistor 46 to the right-hand side of the network resistor 44. The left-hand terminal of the phase mixer 42 is connected by conductor 49 through the output limiting resistor 46 to the left-hand side of the network resistor 44.

The output from the network resistors 44 provides two separate single-phase phase-displaced components through conductors 49, 50, and 51. The zero phase substantially constant single-phase output of the phase mixer 41 is supplied through conductors 50 and 51. The phase-displaced from zero single-phase component is supplied through conductors 49 and 51. The substantially constant single-phase alternating electrical characteristic is supplied by conductors 50 and 51 from the phase mixer 41 and being substantially constant maintains the stylus or pen 36 of the phase indicating or recording instrument 37 in its zero position. This initial adjustment is obtained by rotating the dial 41b until the stylus, pen, or indicating hand 36 of the voltage indicating or recording instrument 37 is in its zero position, and then locking dial 41b in this position. The other phase-displaced single-phase alternating electrical characteristic is supplied from the phase mixer 42 through conductors 49 and 51, and is phase-displaced from zero the desired amount. This other phase-displaced from zero single-phase alternating electrical characteristic is controlled by the direct-current voltage built-up across the output load resistor 33, and proportional to the voltage received at 10, which is indicated by the voltage indicating or recording instrument 37. In the particular construction which I have built I prefer to provide one hundred and twenty electrical degrees phase-displacement of the single-phase output of the phase mixer 42 supplied through conductors 49 and 51 from the substantially constant zero phase component supplied from the phase mixer 41 through conductors 50 and 51.

This one hundred and twenty electrical degree phase displacement of the single-phase electrical characteristics is obtained by first adjusting the dial 41b and the single-phase electrical characteristic derived from the phase mixer 41 to a zero phase position in which the indicating hand 36 of the voltage indicating instrument 37 is in its zero position, and the dial 41b is locked in this position. The phase mixer 42 is then adjusted one hundred and twenty electrical degrees from a zero phase position and its single-phase electrical characteristic is adjusted by adjusting the dial 42b until it is one hundred and twenty electrical degrees displaced from the setting of the dial 41b, and the dial 42b is then locked in this position. These dials 41b and 42b remain locked in their correct adjusted position during operation and use of the amplifier.

These single-phase phase-displaced alternating electrical characteristics are utilized in an electron discharge tube circuit, so that the single-phase substantially constant zero phase component supplied from the phase mixer 41 maintains the stylus, pen, or indicating hand 36 of the indicating or recording instrument 37 in its zero position, as long as the input of the voltage to be indicated is zero. The one hundred and twenty electrical degree phase-displaced single-phase component is rendered ineffective in the electron discharge tube circuit when the input at 10 is zero. If the input at 10 increases the phase-displaced single-phase component is increased in direct proportion to the increased input at 10 of the voltage to be indicated, and the effect of these phase-displaced single-phase electrical characteristics moves the indicating hand 36 of the voltage indicating or recording instrument 37 from its zero position to give the correct indication of the voltage supplied at 10. This mode of operation may be attained in any suitable manner. However, I prefer to utilize an electron discharge tube circuit having at least two grids, one of these grids providing for a supply of a zero-phase single-phase component substantially constant, and maintaining the stylus, pen, or indicating hand 36 in its zero position when the input at 10 is zero. The other one hundred and twenty electrical degree phase-displaced single-phase component is controlled by at least one other grid in an electron discharge tube circuit, so that this second phase-displaced single-phase alternating electrical characteristic will be zero when the input at 10 is zero, and will increase in direct proportion with the input at 10. The combined action of the phase-displaced single-phase electrical characteristics are utilized to actuate the stylus, pen, or indicating hand 36 angularly within the range of the instrument to give the correct indication or record of the voltage to be measured which is received at 10. Any suitable electron discharge tube circuit arrangement and any other circuit arrangement may be utilized to control the stylus, pen, or indicating hand 36 of the voltage indicator or voltage instrument 37 by these electrical characteristics.

In the particular arrangement illustrated in Fig. 1 the substantially constant zero-phase single-phase component maintaining the indicating hand 36 in its zero position when the input at 10 is zero is supplied through the lower grid 52 of a double three-element electron discharge tube 53. The grid 52 is connected to the network resistors by input condenser 54 and conductor 50. The desired bias on the grid 52 is obtained by the grid bias at 55 to provide a single-phase zero-phase component substantially constant, the grid bias further being controlled by the grid bias resistor 56. The lower filament direct, or indirect heating element 52a is connected by conductor 57, conductor 58, conductor 51, and adjustably connected to the lower network resistor 44 at 59. The output of this substantially constant zero-phase component of the alternating electrical characteristic is through the lower plate 52b of the double electron discharge tube 53 and through output circuit load resistor 60, the desired plate voltage being maintained at the upper end of the plate circuit load resistor 60 by the plate voltage supplied through conductor 61. This portion of the circuit is symmetrical with respect to the remaining immediate connected portions of the output circuit of the double electron discharge tube 53.

The one hundred and twenty electrical degree phase-displaced single-phase alternating electrical characteristic component supplied from the phase mixer 42 is phase-displaced from the substantially constant single-phase alternating electrical characteristic zero-phase component supplied by phase-mixer 41 to the lower half of the double three element electron discharge tube 53.

This phase-displaced single-phase alternating electrical characteristic supplied from the phase mixer 42 is supplied to the grid 62 of the upper half of the double electron discharge tube 53, conductor 49, input condenser 63, and conductor 64. The upper filament, direct, or indirect heating element 62a is connected to one side of phase mixer 42 through conductor 57, conductor 58, conductor 51, network resistor 44, and connection 47. The output from the upper half of the double three element electron discharge tube 53 is through plate 62b to output circuit load resistor 65, which is of the same resistance as the output circuit load resistor 69 to provide a symmetrical electrical arrangement. The grid 62 of the upper half of the double three element electron discharge tube 53 ordinarily is biased beyond cut-off by the grid bias voltage derived at 66, conductor 67, output load resistor 33, and resistors 68 and 69. The grid 62 remains biased beyond cut-off, and prevents any output of this single-phase phase-displaced component of the alternating electrical characteristic into the output circuit load resistor 65, so long as the input at 10 of the voltage to be indicated or recorded is zero. As previously explained under this condition the zero-phase single-phase alternating electrical characteristic is constantly supplied from the plate 52b of the lower half of the double electron discharge tube 53 to the plate circuit load resistor 60 and maintains the stylus, pen, or indicating hand 36 of the indicating or recording instrument 37 in its zero position.

The voltage received at 10 is amplified in the resistance coupled electron discharge tubes 11 and 12, rectified in the double two-element electron discharge tube 32, filtered at 34 and 35, and builds up a direct-current voltage, across the output circuit load resistor 33 in opposition to the bias voltage on the grid 62 derived at 66. The direct-current voltage built up across the output circuit load resistor 33 in opposition to this grid bias voltage is directly proportional to the input at 10 of the voltage to be indicated or recorded at 37. The output circuit load resistor 33 builds up a voltage opposing the grid bias voltage at 66 in proportion to the input at 10, and raises the grid bias at 62 above cut-off in direct proportion to the input at 10. The variable single-phase one hundred and twenty electrical degree phase-displaced component output from the upper plate 62b of the double electron discharge tube 53 to the plate circuit load resistor 65 is directly proportional to the input at 10. These two-phase displaced single-phase alternating electrical characteristics control the stylus, pen, or indicating hand 36 of the voltage instrument 37 to give the desired indication or record of the voltage supplied at 10.

In the particular arrangement illustrated in Fig. 1 of the drawings, I prefer to combine the constant zero-phase single-phase alternating electrical characteristic and the variable phase-displaced single-phase alternating electrical characteristic to provide a resultant electrical characteristic or voltage, which is amplified and supplied to the rotatable single-phase two-pole concentrated winding 40 of the voltage indicating or recording instrument 37. For this purpose I provide two additional plate circuit load resistors 70 and 71 of equal resistance, and connected in parallel with the plate circuit load resistors 60 and 65. A connection at 72 provides a resultant single-phase output which is the vector sum of the substantially constant zero phase single-phase alternating electrical characteristic component output from the lower plate 52b, and the variable phase-displaced single-phase alternating electrical characteristic from the upper plate 62b of the double electron discharge tube 53. This output connection 72 provides an input to an amplifying three element electron discharge tube 73 through a blocking condenser 74, and an adjustable input circuit load resistor 75 to the grid 73a of the electron discharge tube 73. The amplifying electron discharge tube 73 is provided with a filament, direct, or indirect heating element 73b having a grid bias resistor 76 and a by-pass condenser 77. The output from the amplifying electron discharge tube 73 is from the plate 73c to a plate circuit load resistor 78.

In order to obtain further amplification of this resultant single-phase alternating electrical characteristic or voltage the amplifying electron discharge tube 73 is coupled to a four element electron discharge tube 79 through a blocking condenser 80 and an input load resistor 81 to a grid 79a of the electron discharge tube 79. This electron discharge tube 79 also has a filament, direct, or indirect heating element 79b connected to a grid bias resistor 82 having a by-pass condenser 83. The four element electron discharge tube 79 also has a screen 79c connected by conductor 84, and through a resistor 85 to a source of biasing voltage at 86. The output from this amplifying four element electron discharge tube 79 is through a plate 87 connected to the primary of an iron core transformer 88. The secondary output of this iron core transformer 88 supplies the amplified combined single-phase alternating electrical characteristic or voltage supplied from the double electron discharge tube 53 or other electron discharge tube circuit or circuit arrangement through conductors 89 to the rotatable single-phase two-pole concentrated winding 40 of the voltage indicating or recording instrument 37. This preferably provides substantially constant torque in all positions and moves the stylus, pen, or indicating hand 36 angularly within the range of the instrument to indicate or record the voltage received at 10.

The voltage indicating or recording instrument 37 is utilized in Fig. 1 of the drawings for indicating or recording the electrical characteristic or voltage derived at 10 from the source of supply, and is preferably of the construction shown in Figs. 2 and 3 of the drawings. The particular construction illustrated in Figs. 2 and 3 was constructed in carrying out my invention, and is actuated angularly to give the correct indication or recording of the voltage derived at 10. In Fig. 2 it will be observed that this voltage indicating or recording instrument 37 includes a cylindrical shell 90 within which are arranged toothed laminations 91, secured in place by annular retaining rings 92 arranged at opposite ends of the laminations. The construction of this instrument may be modified in proportion and arrangement as required for any particular type of service. In the arrangement illustrated these toothed laminations provide a core structure 93 having distributed windings 93a excited from a three-phase alternating-current source of supply, such as the three-phase alternating-current source of supply 39 shown in Fig. 1. This laminated core structure 93 has twenty-four slots, and the three-phase distributed winding provides a rotating field. There preferably are two coils per phase per pole, and the pitch of the coil is from slot one to slot seven. Fig. 4 illustrates the end view of the stator and rotor members taken at line 4—4 of Fig. 3. For clarity, only a few of the slots are shown filled with wires and the bundles or cables of wires are shown carried from one slot to the sixth removed slot.

The three-phase rotating field preferably is utilized to provide the desired angular movement of the stylus, pen, or indicating hand 36 of the voltage indicating or recording instrument 37.

The angularly movable or rotatable portion of this instrument may be constructed in any suitable manner which will actuate the stylus, pen, or indicating hand 36 angularly as required to obtain the correct indication or record on the record sheet which is movable longitudinally with respect to the instrument. The record sheet may be constructed and arranged like Irwin Patent 2,290,330, July 21, 1942, or like the construction disclosed in my copending, concurrently filed application entitled Apparatus for electrically testing materials, Ser. No. 501,024.

In order to obtain the desired angular movement of the stylus, pen, or indicating hand 36 of the indicating or recording instrument 37 the rotatable or movable element which operates or moves the pen 36 angularly as required is made four-pole. This four-pole single-phase rotatably mounted winding 40 extends axially through the core structure and closely conforms to the cylindrical interior of the laminated core structure 93, so that the windings 40 are movably mounted in the air gap. The windings 40 are mounted for angular or rotatable movement on spiders 96 and 97 both arcuately cut-out at 96a and rigidly attached to a rotatably mounted shaft 98 of the instrument. The stylus, pen, or indicating hand 36 is clamped on the end of the shaft 98 at 99, the pen 36 being counter-weighted at 100 to keep the stylus, pen, or indicating hand 36 in mechanical balance. The shaft 98 is mounted in ball bearings 101 and 102. The inner races of these ball bearings are secured against shoulders on the shaft 98 and the outer races of these ball bearings are secured against a shoulder in a stationary tubular mounting 103 by annular clamping nuts 102a and 103a loosely arranged on the shaft 98. The tubular mounting 103 has an external shoulder 104 at one end thereof, and a threaded nut 105 at the other end to secure rigidly the tubular ball bearing support 103 in the stationary cylindrical laminated core structure 106, and to secure the laminated core structure 106 together. The cylindrical laminated core structure 106 is arranged co-axially within the core structure 93 to provide an inner stationary magnetic flux path for the instrument, and is clamped to the stationary core structure 93 by clamps 107 of Bakelite or other insulating material arranged at opposite ends of the air-gap. The clamps 107 are secured in place by bolts 108 extending through the air-gap and clamping nuts 109, the bolts and clamping nuts being made of brass or other non-magnetic material. Thus the outer and inner stationary laminated core structures provide an air-gap in which the winding 40 can move angularly as required to actuate the stylus, pen, or indicating hand 36 mounted on the shaft 98 and indicate or record the voltage. In the particular arrangement illustrated the range of angular movement of the pen 36 is approximately sixty electrical degrees, which is approximately thirty mechanical degrees. The cylindrical shell 90 extends beyond the end of the core structures and windings to provide an enclosing casing which is closed at opposite ends by solid end shields 110 threaded at 111 into the interior of the cylindrical shell 90. The shaft 98 extends through an opening at 112 providing free movement of the shaft 98.

The three-phase distributed winding 38 produces a rotating field. By making the inner laminated core structure 106 stationary this rotating field produced by the three-phase distributed winding 93a does not produce any torque component on the shaft 98 through the inner laminated core structure 106, which would be difficult to compensate in the operation of the instrument. Further, the single-phase four-pole movable winding 40 is energized by the single-phase output of the transformer 88 of Fig. 1, so that substantially constant torque is produced by the four-pole winding 40 in all positions. The substantially constant torque in the four-pole winding 40 is angularly movable in proportion to the measured electrical characteristic, which causes the four-pole winding 40 to move angularly in proportion to the measured voltage. This angular movement of the four-pole winding 40 is proportional to the direction change of the resultant voltage derived at 72 from the double three-element electron discharge tube 53. In this way the four-pole winding 40 produces the high constant torque to provide rapid response to changes in indicated or recorded voltage, and produces the same high torque upon any displacement of the stylus, pen, or indicating hand 36 from its zero position on the chart 36a or scale used therewith or from its correct indicating or recording angular position. The single-phase four-pole winding 40 quickly moves from its zero position to any of its indicating or recording positions within the range of the instrument, and comes to rest in its zero or indicating position with the single-phase winding 40 in zero phase displacement with the rotating field produced by the three-phase distributed winding 38. This mode of operation in which substantial high torque is available for actuating the pen 36 is much more satisfactory than in instruments heretofore available in which the torque has been made proportional to the displacement, and in which the torque is zero in its zero position and in equilibrium in its angularly displaced position. My improved arrangement minimizes any tendency for the chart movement to interfere with the accuracy of the instrument by exerting forces opposing the torque actuating the pen 36 resulting from friction between the pen and the record sheet 36a mounted on a longitudinal carriage 36b movable as indicated by the arrow 36c.

It will thus be seen that when the input 10 in Fig. 1 is zero the stylus, pen, or indicating hand 36 of the voltage indicating or recording instrument 37 remains in its zero position by the action of the single-phase winding 40, and the single-phase winding 40 moves the pen 36 angularly as required to indicate or record the voltage within the range of the instrument 37. The preferred embodiment of this voltage indicating or recording instrument 37 above described, and shown in Figs. 2 and 3 of the drawings, provides terminals for supplying the output of the transformer 88 in Fig. 1 to the four-pole single-phase rotatably mounted winding 40 which turns the shaft 98 angularly as required to give the desired indication or record of the voltage being received at 10 in Fig. 1 of the drawings.

In the operation of the voltage indicating or recording circuit arrangement and instrument above described and illustrated in Figs. 1, 2, and 3 of the drawings, the input at 10 in Fig. 1 of the electrical characteristic or voltage to be indicated or recorded by the stylus, pen, or indicating hand 36 of the voltage indicating or recording instrument 37 provides sufficiently amplified output from the transformer 88 to actuate without overloading the single-phase angularly movable and rotatably mounted winding 40. The relatively feeble input at 10 is controlled by the single-phase five-position switch 14, which selectively includes more or less of the input resistor 13 to control the output 88 within the requirements of the voltage indicating or recording instrument 37. This electrical characteristic or voltage input at 10 is amplified in the resistance coupled amplifying tubes 11 and 12, further amplified in the transformer 31, rectified in the double two-element rectifying tube 32, and the output of the double two-element rectifying tube 32 is filtered at 34 and 35 to provide a direct-current voltage across the output load resistor 33 approximately proportional to the electrical characteristic or voltage input at 10. When the input of the electrical characteristic or voltage at 10 is zero the voltage across the output circuit load resistor 33 is zero, and the stylus, pen, or indicating hand 36 of the voltage indicating or recording instrument 37 remains in its zero position, and the pen 36 of the voltage indicating or recording instrument shown in Figs. 2 and 3 will remain in its zero position.

In the particular arrangement shown in Fig. 1 of the drawings two electrical characteristics are utilized, and at least one of these electrical characteristics is controlled by the direct-current voltage built up across the output load resistor 33, so that the stylus, pen, or indicating hand 36 of the voltage indicating or recording instrument 37 is moved from its zero position approximately proportional to the electrical characteristic or voltage input at 10 and the direct-current voltage built up across the output circuit load resistor 33. In the particular arrangement disclosed this is accomplished by utilizing the direct-current voltage built up across the output load resistor 33 to control the electrical characteristics in an electron discharge tube circuit. This electron discharge tube circuit includes the double three-element electron discharge tube 53 providing a substantially constant zero phase component electrical characteristic supplied from the phase mixer 41 through conductors 48 and 50 to the lower grid 52, and terminal 47, adjustable resistor 59, conductors 51, 58, and 57 to the lower filament direct or indirect heating element 52a of the electron discharge tube 53. This substantially constant zero-phase single-phase component is supplied from the lower half of the three-element electron discharge tube 53 through the lower plate 52b to the plate circuit load resistors 69, 65, 70, and 71. When the input at 10 is zero, the direct-current voltage across the output circuit load resistor 33 is zero, and the upper grid 62 of the double three-element electron discharge tube 53 is biased beyond cut-off by the biasing voltage derived at 66 through conductors 67, resistors 33, 68, and 69 to the upper grid 62. Under this condition there is no output from the upper half of the double three-element electron discharge tube 53 through the grid 62 which has the upper plate 62b thereof connected to the plate circuit load resistors 60, 65, 70, and 71. Upon an increase of the input at 10 of the electrical characteristic or voltage being indicated or recorded within the range of the circuit arrangement and indicating or recording instrument 37 of Fig. 1, the direct-current voltage built up across the output load resistor 33 approximately proportional to the input at 10 is in opposition to bias on the grid 62 derived at 66. This proportional increase of the direct-current voltage across the output circuit load resistor 33 biases the grid 62 above cut-off and supplies a one hundred and twenty degree phase-displaced from zero single-phase component of the single-phase electrical characteristic through the upper plate 62b to the plate circuit load resistors 60, 65, 70, and 71. This one hundred and twenty degree phase-displaced single-phase component is proportional to the input at 10, proportional to the direct-current voltage built up across the output load resistor 33, and in opposition to the bias on the grid 62 derived at 66. This one hundred and twenty degree phase-displaced from zero single-phase electrical characteristic or voltage is supplied from the phase-mixer 42 through conductors 49, input condenser 63, and conductor 64 to the grid 62, and from the other side of the phase mixer 41 through output limiting resistor 46 adjustable connection 59, and conductors 51, 58, and 57 to the upper filament, direct, or indirect heating element 62a. The one hundred and twenty degree phase-displaced from zero single-phase component output through the upper plate 62b of the double electron discharge tube 53 proportional to the input at 10 is supplied to the output circuit resistor network 60, 65, 70, and 71. This phase-displaced from zero single-phase component is combined with the zero phase single-phase component in this resistor network 60, 65, 70, and 71 to provide a combined resultant single-phase output at 62, which is amplified in the three-element amplifying tube 73, amplified in the four-element amplifying tube 79, and amplified in the transformer 88. The amplified output of the transformer 88 is supplied through the conductors 89 to the single-phase winding 40 of the voltage indicating or recording instrument 37, and thus moves the stylus, pen, or indicating hand 36 angularly to give the required indication of voltage input at 10. The output from the transformer 88 through conductors 89 will produce a similar actuation of the stylus, pen, or indicating hand 36 of the voltage indicating or recording instrument 37 shown in Figs. 2 and 3 of the drawings by energization of the four-pole angularly movable windings 94 and 95 of this instrument, which are arranged within the three-phase distributed winding 93a in the outer stationary core structure and providing a rotating field in the outer core structure 93 and the inner stationary core structure 106.

The operation of the system can be readily understood from the graphical diagrams shown in Figs. 5 and 6. Fig. 5 is a vector diagram showing the relationship of the voltages at the double triode tube 53. The vector A represents the steady alternating current voltage F applied on grid 52 from phase mixer 41. The vector B represents the A. C. voltage F' on grid 62 from phase mixer 42. The angle between vectors A and B is exactly 120°, this being the angle which has been selected in this example for the initial adjustments of dials 41b and 42b, which are initially turned relative to each other so that the phases of their single phase alternating current output voltages are 120° apart.

Vector A is fixed in phase and in magnitude, but vector B, although fixed in phase, varies in magnitude in accordance with the variable bias due to the unidirectional current flowing through resistor 33. This is illustrated in Fig. 6, which shows the grid voltage-anode current characteristic curve D of each of the triodes in tube 53, it being assumed that the characteristics of both triodes are the same. The steady bias on grid 52 is set at some point G, well above the cutoff point; and the steady alternating voltage F is illustrated in Fig. 6 as applied to this grid. The steady bias on grid 62 is set beyond cutoff as shown by point E, and remains there in the absence of an impressed alternating voltage at source 10. There is imposed upon this grid the steady alternating voltage F' from phase mixer 42. When a voltage is received from source 10, the resulting unidirectional current through resistor 33 changes the bias on grid 62 from E to some other point E'. Thus point E moves along the abscissa by an amount corresponding to the instantaneous alternating voltage at source 10. The change from E to E' increases the flow of anode current through the tube, causing a greater output representing voltage F' at the output resistor 70, thus increasing the length of vector B to a greater length B'. Vector B, accordingly increases and decreases in magnitude in accordance with changes in magnitude of alternating voltage from source 10. The voltages represented by vectors A and B are combined in the output of tube 53, producing a resultant vector C. Now when vector B changes, the phase of vector C is changed considerably without much change in its magnitude. This is indicated by the change of vector C to C' due to the change in magnitude from B to B'.

The voltage of vector C, amplified in stages 73 and 79, is impressed on the rotor winding 40 of the voltage indicator. Since the stator winding of the voltage indicator 57 has a constantly rotating three-phase field, the rotor member will align itself in correspondence with the instantaneous poles of the stator. Since the phase of the voltage on winding 40 is changing in correspondence with changes in magnitudes of impressed voltages at 10, the angular position of winding 40 relative to stator 38 will correspondingly change, since member 40 will always have a force on it tending to align its instantaneous polarity, as determined by its phase, with the instantaneous poles of the stator. This operation depends on the frequency of the source 43 being the same as the frequency of the source 39. It is not necessarily essential that these two sources be in the same phase, but a fixed phase relation must be maintained.

Although I have illustrated the particular embodiment of my novel voltage indicating or recording circuit or instrument, I do not desire my invention to be limited to the particular voltage circuit arrangement or instrumentalities above described, and I intend in the appended claims to cover all modifications which do not depart from the spirit and scope of my invention.

What I claim as new and desire to secure by Letters Patent of the United States is:

1. A voltage indicator including means for receiving a voltage to be indicated, means for producing a substantially constant alternating electrical voltage, means for producing another alternating electrical voltage displaced in phase from the first-mentioned alternating electrical voltage, an electron discharge tube circuit including at least two grids, means for supplying the alternating electrical voltages to said electron discharge tube circuit, means including one of said grids for supplying the substantially constant alternating electrical voltage to said electron discharge tube circuit, means including the other of said grids and responsive to the voltage received for supplying the other of the alternating electrical voltages to said electron discharge tube circuit in approximate proportion to the voltage received, means including coupling resistors for combining the alternating electrical voltages, and means responsive to the combined alternating electrical voltages for indicating the voltage received.

2. A voltage indicator including means for receiving a voltage to be indicated, means for producing a substantially constant alternating electrical voltage, means for producing another alternating electrical voltage displaced in phase from the first-mentioned alternating voltage, an electron discharge tube circuit including at least two grids, means for supplying the electrical voltages to said electron discharge tube circuit, means including one of said grids for supplying the substantially constant alternating electrical voltage to said electron discharge tube circuit, means including the other of said grids and responsive to the voltage received for supplying the other of the alternating electrical voltages to said electron discharge tube circuit in approximate proportion to the voltage received, means including coupling resistors for combining the alternating electrical voltages, means for amplifying the combined alternating electrical voltages, and means responsive to the combined electrical voltages for indicating the voltage received.

3. A voltage indicator including means for receiving a voltage to be indicated, means for amplifying the voltage received, means for rectifying the voltage received, means for producing a substantially constant alternating electrical voltage, means responsive to the rectified voltage for producing an alternating electrical voltage approximately proportional to the voltage received and displaced in phase from the constant alternating electrical voltage, means for combining said alternating electrical voltages, means for amplifying the combined alternating electrical voltages, and means responsive to the combined and amplified alternating electrical voltages for indicating the voltage received.

4. A voltage indicator including means for receiving the voltage to be indicated, means for amplifying the voltage to be indicated, means for rectifying the amplified voltage received, means including at least two grids and an electron discharge circuit for receiving alternating electrical voltages, means for impressing said alternating electrical voltages on said grids, means including one of said grids for providing a substantially constant alternating electrical voltage, means controlled by the amplified and rectified voltage received and utilizing the other of said grids for producing a second alternating electrical voltage approximately proportional to the voltage received and displaced in phase from the constant alternating electrical voltage, means including resistance coupling for combining the alternating electrical voltages, means for amplifying the combined alternating electrical voltages, and means responsive to the combined electrical voltages for indicating the voltage received.

5. A voltage indicator including means for receiving the voltage to be indicated, means for amplifying the voltage received, means for rectifying the amplified voltage received, means including at least two grids and an electron discharge circuit for receiving alternating electrical voltages, means for impressing said alternating electrical voltages on said grids, means including one of said grids for providing a substantially constant alternating electrical voltage, means for biasing the other of said grids beyond cut-off, means controlled by the amplified and rectified voltage received in opposition to the biasing voltage of said other of said grids and utilizing said other of said grids for producing a second alternating electrical voltage approximately proportional to the voltage received and displaced in phase relative to said constant alternating electrical voltage, means including resistance coupling for combining the alternating electrical voltages, means for amplifying the combined alternating electrical voltages, and means responsive to the combined electrical voltages for indicating the voltage received.

6. A system for indicating the magnitude of an impressed voltage comprising a rectifier for producing a unidirectional voltage proportional to the impressed voltage, a pair of electron discharge devices each having a cathode, anode and control grid, said discharge devices having a combined output circuit, two sources of alternating voltage displaced in phase from each other, connections for applying the two sources respectively to the two grids, means for applying said unidirectional voltage to one of said grids, and a phase indicating device responsive to said combined output.

7. A system for indicating the magnitude of a voltage comprising means for developing a unidirectional voltage of a magnitude proportional to the magnitude of the first-mentioned voltage, a pair of electron discharge devices each having an anode, cathode and control electrode, and having their output circuits combined, means for impressing on each of said control electrodes an alternating voltage of constant magnitude, the two alternating voltages having the same frequency and a fixed phase difference, one of said control electrodes having also impressed thereon said unidirectional voltage, and a phase indicating device responsive to the voltage in said combined output circuits.

8. A system for indicating the magnitude of a voltage, comprising a rectifier circuit for developing a unidirectional voltage of a magnitude proportional to the magnitude of the first-mentioned voltage, a pair of electron discharge devices each having an anode, cathode and control electrode and having their output circuits combined, one of said control electrodes having a D. C. bias near the cutoff point in the absence of said first-mentioned voltage, the other of said control electrodes having a D. C. bias above the cutoff point, two sources of alternating voltage of constant magnitude and the same frequency, one of which is impressed on one control electrode and the other of which is impressed on the other control electrodes, said two alternating sources having a fixed phase displacement relative to each other, a connection for impressing said unidirectional voltage on the control electrode which is biassed near cutoff, and a phase indicating device responsive to the voltage produced in said combined output circuits.

9. A system according to claim 8 in which said unidirectional connection on the control electrode biassed near cutoff is in the polarity to increase the anode-cathode current when the unidirectional voltage increases.

10. A system according to claim 8 in which the phase indicating device comprises a polyphase stator field producing constantly rotating instantaneous poles, and an indicating rotating member having a winding carrying current corresponding to said combined output.

11. A system for indicating the magnitude of a voltage comprising means for developing a unidirectional voltage of a magnitude proportional to the magnitude of the first-mentioned voltage, a pair of electron discharge devices each having an anode, cathode and control electrode, and having their output circuits combined, a pair of phase mixers, each having a field on which is impressed a polyphase voltage and an armature having a winding which delivers a single phase output voltage, said armatures being positioned to produce a fixed phase difference between their respective output voltages, the output from one armature being impressed on one of the control electrodes and the output of the other armature being impressed on the other control electrode, said control electrodes having different normal D. C. biasses, and a connection for impressing the unidirectional voltage on the control electrode having the less positive bias, a phase indicating device having a polyphase field with the same frequency as applied to the phase mixers and a rotor member which assumes an angular position in respect to the last mentioned field, and circuits for impressing on the rotor winding a voltage corresponding to said combined output.

12. The method of indicating the magnitude of a voltage which comprises generating a unidirectional voltage proportional to the magnitude of said first-mentioned voltage, independently generating two alternating voltages with a fixed relative phase displacement between them, controlling the magnitude of one of said alternating voltages in accordance with the magnitude of said unidirectional current, then combining the two generated alternating voltages, and then measuring the phase displacement of said combined voltage relative to the phase of one of the generated alternating voltages.

EDGAR T. HOWES.

REFERENCES CITED

The following references are of record in the file of this patent:

UNITED STATES PATENTS

| Number | Name | Date |
|---|---|---|
| 2,267,820 | Droz | Dec. 30, 1941 |
| 2,309,560 | Welty | Jan. 26, 1943 |
| 2,316,434 | Irwin | Apr. 13, 1943 |
| 2,228,883 | Morgan | Jan. 14, 1941 |
| 2,189,289 | Moore | Feb. 6, 1940 |
| 2,263,497 | Harrison | Nov. 18, 1941 |
| 1,794,618 | Howe | Mar. 3, 1931 |
| 2,110,673 | McConnell | Mar. 8, 1938 |
| 2,110,676 | Prince | Mar. 8, 1938 |
| 2,190,743 | Vance | Feb. 20, 1940 |
| 2,208,329 | Morelock | July 16, 1940 |
| 695,913 | Conrad | Mar. 25, 1902 |
| 2,188,785 | Hall | Jan. 30, 1940 |
| 2,276,506 | Moore | Mar. 17, 1942 |
| 2,346,838 | Haight | Apr. 18, 1944 |